Patented Jan. 17, 1933

1,894,620

UNITED STATES PATENT OFFICE

OTTO KRESS, OF APPLETON, WISCONSIN

PROCESS OF PRODUCING A WHITE FILLER PRODUCT FROM SULPHATE PULP LIME MUD

No Drawing.    Application filed June 26, 1929. Serial No. 373,955.

This invention relates to an improved process of producing a white filler product from sulphate lime mud.

In the sulphate process of pulping wood, there is produced from the recovery of the alkali, what is known in the trade as green liquor, and this green liquor is treated with lime to convert the sodium carbonate to sodium hydroxide, while the sodium sulphide is unacted upon and the lime mud produced by the causticizing of the green liquor to form white liquor has a decided bluish green color and has been used heretofore for sweetening acid soil and has also been reburned to form lime and for other purposes where the color of the mud was of no importance.

It is one of the main objects of my improved process to take this lime mud and through an improved process in bleaching, produce a white filler product. After the bleaching process, the mud can be washed by any of the well known methods and filtered and barrelled as a paste or dried and ground to be used as white powder, and this product can be used for a great many purposes.

Another object of my invention is the process of producing a white product from sulphate lime mud wherein the lime mud is treated with an oxidizing agent to convert the impurities present and then remove them by washing after which the clarified material is then causticized so as to free the same of the bulk of the impurities and then washed and filtered to provide a finished product.

In the sulphate process of pulping the wood in chip form is digested in a suitable equipment with a solution of sodium sulphide and sodium hydroxide, using approximately sixteen to twenty pounds of alkali to one hundred pounds of bone dry wood. Upon completing the cooking operation, the pulp is blown into suitable equipment where the waste liquor is washed from the pulp, as this liquor contains the chemical that has to be recovered or reclaimed. This liquor is known in the trade as black liquor and contains the alkali, mainly in the form of sodium salts of various organic acids.

After the black liquor has been reclaimed, it is evaporated and burned in the form of a dense liquor, or a solid.

The liquor can be burned in various ways and during the burning there is mixed with it salt cake which is sulphate of sodium, which will be reduced in the burning process to sodium sulphide whereby the molten smelt from the furnace will consist essentially of a mixture of sodium sulphide and sodium carbonate. The smelt flowing from the furnace is dissolved in a suitable tank and produces what is known in the trade as green liquor.

This green liquor is treated with lime, usually in the proportion of five hundred pounds of lime to a ton of pulp, converting the sodium carbonate to sodium hydroxide, while the sodium sulphide is unacted upon. Treating the green liquor with lime produces a lime mud and a white liquor that is used for pulping wood. The lime mud being of a decided bluish green color and heretofore has been used for sweetening acid soil or has been reburned to form lime. All of the above is well known in the sulphate pulp mill practice.

As stated heretofore, it is one of the principal objects of my invention to treat this lime mud and produce a white paste or powder which can be used as a filler for various purposes, and in order to carry out this process, I found that the lime mud can be treated with an oxidizing agent which will convert the main impurities present in the mud, which is iron sulphide to a water soluble product that can be removed by washing. The purified product after washing, can be filtered and then barrelled as a paste or dried into powder form and sold on the market in suitable containers; such as barrels or sacks.

As the oxidizing agent, I prefer to use bleaching powder which is chemically known as calcium hypochlorite, or other compounds having available chlorine or a solution of chlorine gas in water could be used.

It will be apparent that other oxidizing agents might be used, but on account of cheapness, bleaching powder is the preferred chemical.

In using the bleaching powder for converting the impurities in the lime mud to produce a white product, it has been found, from practical experience, that from five to ten percent of bleaching powder is required, based upon the weight of dry lime mud treated. One of the methods of treating lime mud that will not only reduce the amount of bleach required, but also produces a whiter product, is to filter the green liquor or remove most of the iron sulphide in suspension by proper settling. The clarified green liquor is then causticized in the usual manner and the lime mud will then be free of the bulk of impurities requiring less chemical and bleaching powder and at the same time producing a whiter product.

It will be apparent from the foregoing that I have provided an improved process for utilizing lime mud, which is produced through the sulphate pulping process, whereby a substantially pure white filler product is produced that can be used for a great many purposes and the steps of the process are extremely simple.

The chemicals used for carrying out the process are of an inexpensive nature, so that the finished product can be placed on the market and sold at a low cost.

I claim:

The method of treating green liquor obtained in the sulphate process of pulping wood, which consists in first treating a green liquor with a lime to form a lime mud and a white liquor; second, removing the white liquor from the lime mud; third, then oxidizing the lime mud by mixing calcium hypochlorite therewith, then washing and filtering the oxidized mud and finally drying and grinding the same to a powdered form.

In testimony that I claim the foregoing I have hereunto set my hand at Milwaukee, in the county of Milwaukee and State of Wisconsin.

OTTO KRESS.